(12) United States Patent
Moss et al.

(10) Patent No.: US 8,532,826 B2
(45) Date of Patent: Sep. 10, 2013

(54) SYSTEM AND METHOD FOR CONTROLLING TEMPERATURE IN AN INFORMATION HANDLING SYSTEM

(75) Inventors: David L. Moss, Austin, TX (US); Paul Artman, Austin, TX (US); Tyler Duncan, Austin, TX (US)

(73) Assignee: Dell Product L.P., Round Rock, TX (US)

( * ) Notice: Subject to any disclaimer, the term of this patent is extended or adjusted under 35 U.S.C. 154(b) by 413 days.

(21) Appl. No.: 12/721,116

(22) Filed: Mar. 10, 2010

(65) Prior Publication Data
US 2011/0224837 A1 Sep. 15, 2011

(51) Int. Cl.
*G05B 13/00* (2006.01)
(52) U.S. Cl.
USPC .............................. 700/276; 340/500; 713/320
(58) Field of Classification Search
USPC .......................... 700/276; 340/500; 713/320
See application file for complete search history.

(56) References Cited

U.S. PATENT DOCUMENTS

| | | | |
|---|---|---|---|
| 4,722,669 A | 2/1988 | Kundert | 417/32 |
| 5,101,040 A | 3/1992 | Cohen | 548/483 |
| 5,102,040 A | 4/1992 | Harvey | 236/49.3 |
| 6,868,652 B2 | 3/2005 | Arends et al. | 53/446 |
| 7,130,719 B2 * | 10/2006 | Ehlers et al. | 700/276 |
| 7,424,343 B2 * | 9/2008 | Kates | 700/276 |
| 2004/0133314 A1 * | 7/2004 | Ehlers et al. | 700/276 |
| 2005/0030171 A1 * | 2/2005 | Liu et al. | 340/500 |
| 2006/0214014 A1 * | 9/2006 | Bash et al. | 236/1 B |
| 2009/0099696 A1 * | 4/2009 | Artman et al. | 700/276 |
| 2009/0265568 A1 * | 10/2009 | Jackson | 713/320 |

OTHER PUBLICATIONS

Patent Application and Drawings; U.S. Appl. No. 12/354,101; Collins et al.; "System and Method for Temperature Management of a Data Center"; pp. 21; filed Mar. 10, 2010.
Collins et al.; "System and Method for Temperature Management of a Data Center"; U.S. Appl. No. 12/354,101, filed Jan. 15, 2009; pp. 25.

* cited by examiner

*Primary Examiner* — Mohammad Ali
*Assistant Examiner* — Anthony Whittington
(74) *Attorney, Agent, or Firm* — Baker Botts L.L.P.

(57) ABSTRACT

Systems and methods for controlling temperature in an information handling system is provided. In certain embodiments, a method may include receiving a desired threshold value, determining if a current real-time system value exceeds the desired threshold value, determining if a power shedding mode is enabled, if the power shedding mode is enabled, adjusting power supplied to the information handling system, and if the power shedding mode is not enabled, dynamically adjusting a fan speed of a cooling fan associated with the information handling system.

14 Claims, 2 Drawing Sheets

SYSTEM AND METHOD FOR CONTROLLING TEMPERATURE IN AN INFORMATION HANDLING SYSTEM

TECHNICAL FIELD

The present disclosure relates in general to information handling systems, and more particularly to systems and methods for maintaining a temperature differential across the systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain settings, one or more information handling systems may be configured within an enclosure that forms a rack (e.g., a server rack), and multiple racks may form a data center or an information handling center. The physical environment, especially the temperature of the data center is typically under strict control. One or more cooling units may be typically provided to control the temperature and humidity in the data center. For example, in a typical chilled water facility, for example, where large air handling units (AHU) pressurize a raised floor, energy is used by the AHU to transport chilled air to the server and heated air back from the server. Energy is also used remotely at the chiller plant to chill water for use around the facility, at the outside condenser for ultimate heat rejection, and for transporting fluid (e.g., water) to and from the chiller and condenser. As the AHU uses energy to move air, it also adds heat to the facility that must be removed through the chiller and condenser. The open, raised floor environment is often accompanied by a large over-provisioning of AHU's due to poor and unpredictable airflow dynamics that create hot spots. Many data centers end up over-provisioning to cool these hot spots and/or use much more energy than needed in chilling the air to temperatures lower than necessary.

SUMMARY

In accordance with the teachings of the present disclosure, the disadvantages and problems associated with system cooling have been reduced or eliminated. In some embodiments, a method for controlling temperatures in an information handling system is provided. The method may include steps for receiving a desired threshold value, determining if a current real-time system value exceeds the desired threshold value, determining if a power shedding mode is enabled, if the power shedding mode is enabled, adjusting power supplied to the information handling system, and if the power shedding mode is not enabled, dynamically adjusting a fan speed of a cooling fan associated with the information handling system.

In other embodiments, a method is provided. The method may include steps for receiving a desired temperature differential value, receiving a power consumption value for a component associated with a information handling system, receiving a fan speed of a cooling fan associated with the information handling system, determining a current temperature differential value based at least on the power consumption value and the fan speed, determining if the current temperature differential value exceeds the predetermined temperature differential value, and if the current temperature differential value exceeds the predetermined temperature differential value, dynamically adjusting the fan speed of the cooling fan.

In some embodiments, a system for controlling temperatures in an information handling system is provided. The system may include a cooling fan configured to direct cool air to components of the information handling system and a controller communicatively coupled to the cooling fan. The controller may be configured to receive a desired threshold value, determine if a current real-time system value exceeds the predetermined threshold value, determine if a power shedding mode is enabled, if the power shedding mode is enabled, adjusting power supplied to the information handling system, and if the power shedding mode is not enabled, dynamically adjusting a fan speed of a cooling fan associated with the information handling system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
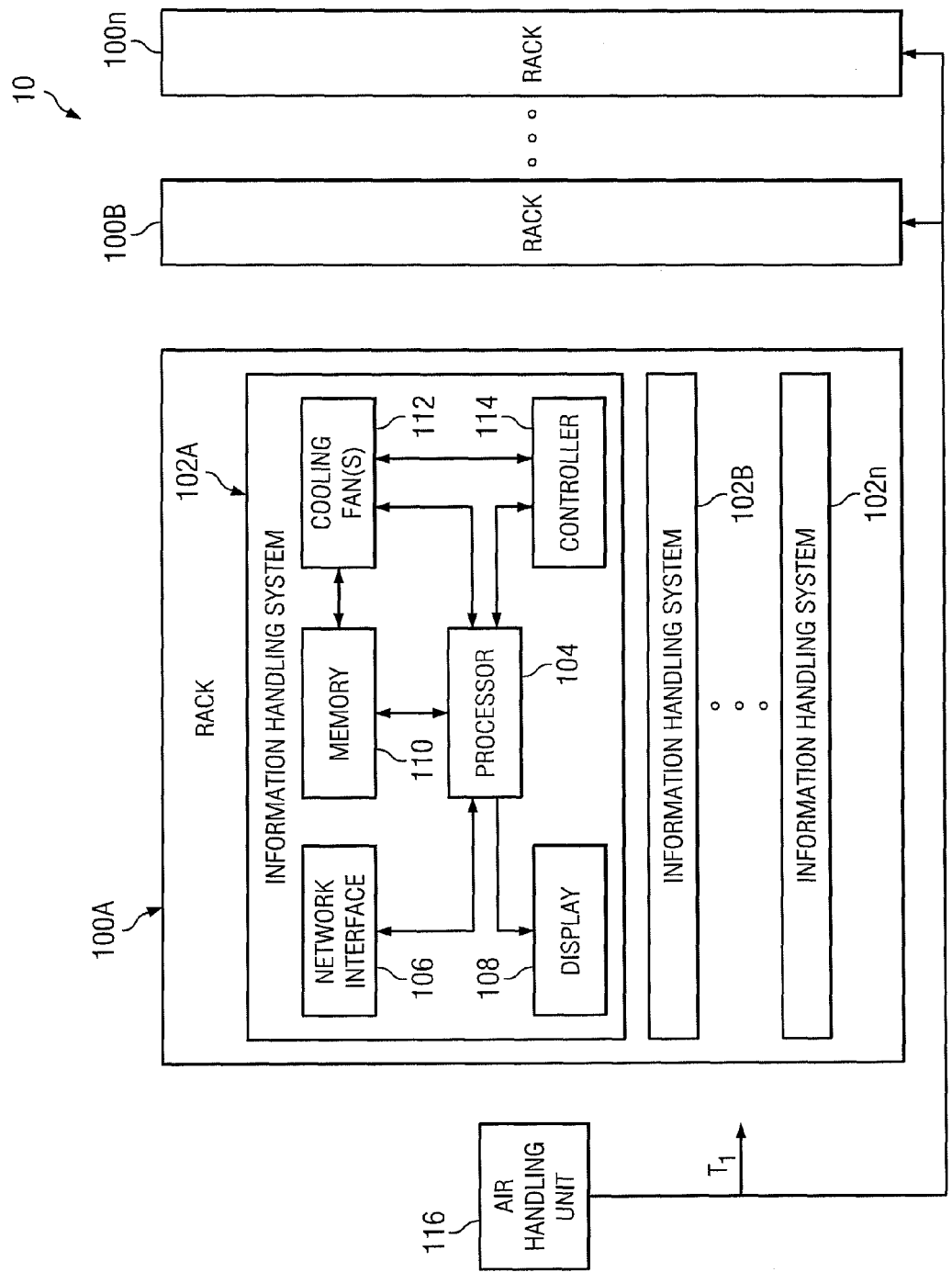
FIG. 1 illustrates an example embodiment of a system configured for controlling a temperature change, in accordance to certain embodiments of the present disclosure.
Figure 2:
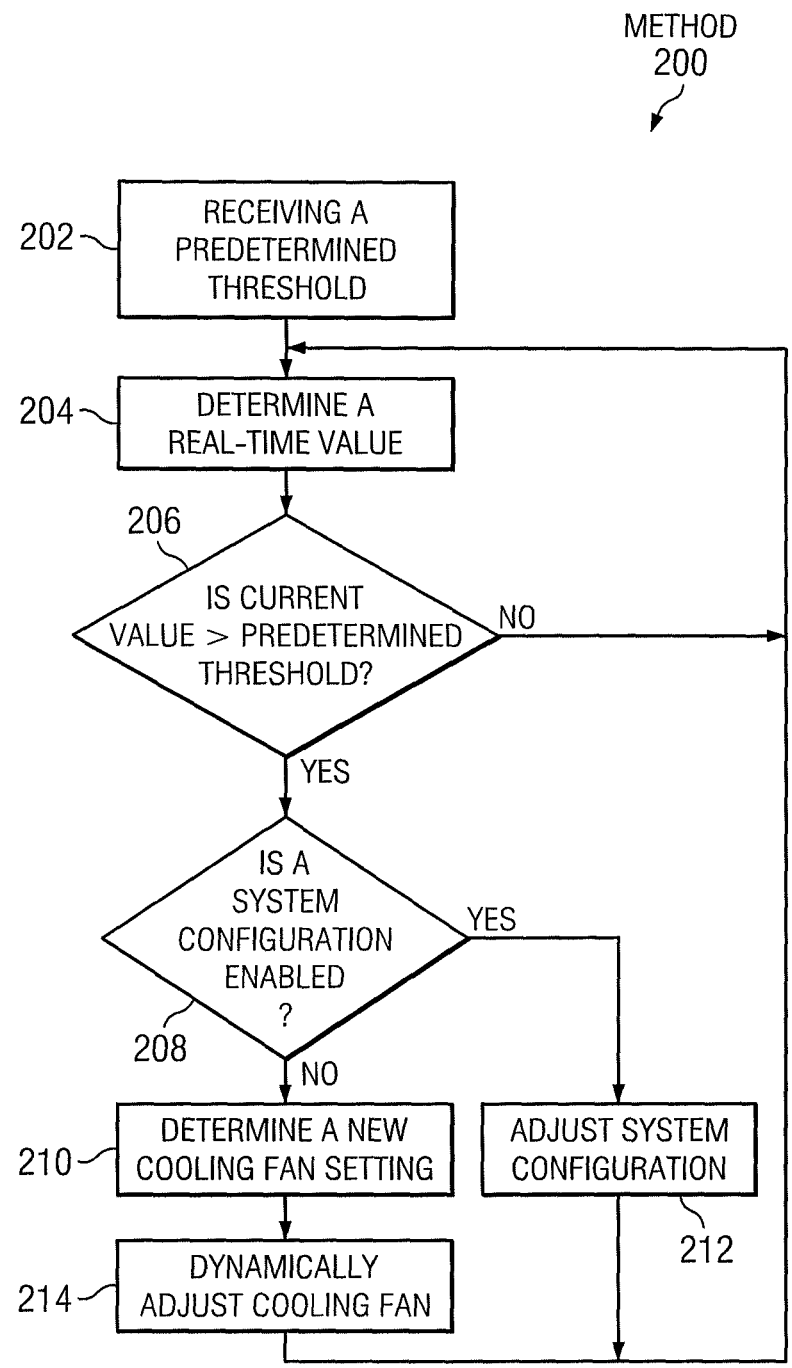
FIG. 2 illustrates a flow chart of an example method for controlling the temperature change in a system, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

FIG. 1 illustrates an example embodiment of a system configured for controlling a temperature change, in accordance with certain embodiments of the present disclosure. System 10 may be placed in any suitable space, such as for example a data center or a computer center. In some embodiments, the space may be equipped with a raised floor and vent tiles configured to provide cool air to racks 100. In the same or alternative embodiments, the space may be configured with other suitable cooling configurations including, but not limited to, chimney systems, hot and/or cold aisle containment systems, and/or other containment systems.

Racks 100 may support and/or house one or more information handling systems 102, hardware devices, hard disk drives, modems, network components, and/or other electronic equipment. Racks 100 may be configured to provide services to the various servers such as power, cooling, networking, interconnects, and management. In some embodiments, racks 100 may allow air flow by including one or more openings. For example, cool air from air handling unit 116 may enter through a bottom side of rack 100, where the cooling air cools racks 100, and in particular, the components of racks 100. It is noted that cool air provided by air handling unit 116 may also enter through other openings of racks 100 and/or the cool air may be directed towards components of racks 100 via for example, cooling fans 112 coupled to the components of racks 100.

As depicted in FIG. 1, racks 100 may include one or more information handling systems 102A-n. One type of information handling system is a server. Servers are often self-contained information handling systems designed specifically to allow the placement of multiple servers in a single enclosure (e.g., rack 100A) or aggregation of enclosures (e.g., racks 100A-n).

Each information handling system 102 may include processor 104, network interface 106, display 108, memory 110, cooling fan(s) 112, and controller 114. Processor 104 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored and/or communicated by one or more of memory 108, another component of information handling system 102, and/or other components of rack 100.

Network interface 106 may be any suitable system, apparatus, or device operable to serve as an interface between information handling system 102 and a network. Network interface 106 may enable information handling system 102 to communicate over a network using any suitable transmission protocol and/or standard, including without limitation all transmission protocols and/or standards known in the art.

Display 108 may comprise any display device suitable for creating graphic images and/or alphanumeric characters recognizable to a user, and may include, for example, a liquid crystal display (LCD) or a cathode ray tube (CRT).

Memory 110 may be communicatively coupled to processor 104 and may comprise any system, device, or apparatus operable to retain program instructions or data for a period of time. Memory 108 may comprise random access memory (RAM), electrically erasable programmable read-only memory (EEPROM), a PCMCIA card, flash memory, or any suitable selection and/or array of volatile or non-volatile memory that retains data after power to information handling system 102 is turned off.

Each cooling fan 112 may be any mechanical or electromechanical fan used for cooling components of information handling system 102. In certain embodiments, cooling fans 112 may draw cool air from the outside, expel warm air from components of information handling system 102, and/or move air across a heat sink to cool one or more particular components of information handling system 102.

In some embodiments, multiple cooling fans 112 may form a redundant cooling fan array. A redundant cooling fan array may permit continued cooling of information handling system 102 in the event that one or more of cooling fans 112 fails.

In some embodiments, two or more cooling fans 112 may be coupled in series such that the flow outlet of one fan 112 feeds the flow inlet of another fan 112. Often, two fans in series may be capable of delivering more air pressure as compared to equivalent fans configured in parallel.

It is noted that although cooling fan 112 is shown as being communicatively coupled to processor 104, cooling fan 112 may be coupled to more than one component of information handling system 102. In other embodiments, a single cooling fan 112 may be coupled to a single component of information handling system 102 and configured to cool the single component.

Controller 114 may be communicatively coupled to processor 104 and may be any hardware, software, and/or firmware configured to control the fan speed of cooling fan(s) 112. In some embodiments, controller 114 may be a baseboard management controller (BMC), a chassis management controller (CMC), a remote access controller (RAC), or any other suitable controller known in the art.

Air handling unit 116 may be coupled to racks 100 and may be configured to cool, vent, remove humidity, and/or provide air circulation to components of racks 100. In some embodiments, air handling unit 116 may be a computer room air condition unit (CRAC) configured to intake air from the surroundings through an intake and cools the airflow for output of a cooling airflow with a temperature $T_1$ through an exhaust. The output air from air handling unit 116 may be directed to racks 100 through, for example, a plenum defined beneath a raised floor.

In the same or alternative embodiments, air handling unit 116 may be a computer room air handling unit (CRAH) using circulating chilled water and a chiller to cool air emitted from racks 100. It is noted that other air handling units, including, but not limited to, in space unit (ISU), hot and cold aisle containment arrangements, and other cooling units may be used in system 10.

For each information handling system 102 in system 10, a user may set a desired threshold value(s) via, for example, a graphical user interface displayed on display 108. In some embodiments, a user may set a desired exhaust temperature emitted from one or more racks 100 and/or a desired ΔT temperature. ΔT refers to the rise in temperature in information handling system 102, and in particular, the temperature difference between the air output from air handling unit 116 and air expelled from racks 100 in general.

Based on the desired threshold value, controller 114 may be configured to control fan speeds of cooling fans 112. For example, if rack 100A is being serviced, a user may set one or more information handling systems 102 of rack 100A to a lower ΔT and/or may set a desired exhaust temperature emitted from rack 100A and/or racks surrounding rack 100A. The change in fan speed of cooling fans 112 may decrease the temperature of the exhaust expelled from rack 100A resulting in a lower ΔT as desired by the user.

In some embodiments, ΔT and/or an exhaust temperature threshold may also be set for one or more information handling systems 102 of system 10 to optimize certain operating conditions. For example, an exhaust temperature threshold may be set to minimize surface temperatures or exhaust of components of racks 100 for maintenance, or to maintain certain implementations of components (e.g., temperature ratings of a particular component in rack 100, PCI card implementations, and/or intra-rack component-to-component effects). In other embodiments, a ΔT threshold may be set to maintain a balance with air handling units 116 of system 10. For example, air handling unit 116 may operate to achieve a certain operating temperature, $T_1$, based on a design limitation, $\Delta T_{ahu}$, which is a measurement determining the ability of air handling unit 116 to reduce the increased temperature expelled from rack(s) 100. However, due to higher temperatures received at air handling unit 116, the desired temperature $T_1$ may not be attainable due to the limitation of $\Delta T_{ahu}$. By setting a ΔT threshold for one or more information handling systems 102 in system 10, and thus, predetermining the temperature differential in system 10, $T_1$ may be achieved and operational balance between the racks 100 and air handling unit 116 may be obtained.

In operation, when information handling system 102 is set to a desired ΔT and/or a desired exhaust temperature for racks 100, controller 114 may adjust one or more cooling fans 112 such that ΔT and/or the exhaust temperature is at or below a desired threshold value set by system 10 and/or by a user. In some embodiments, if a desired exhaust temperature threshold is set, controller 114 and/or processor 104 may determine a current exhaust temperature and compare the current exhaust temperature to the desired exhaust temperature threshold. In some embodiments, controller 114 and/or processor 104 may determine the difference between the temperature of the air provided by air handling unit 116 and a current ΔT. Details of determining a current ΔT are described below. If the current exhaust temperature exceeds the desired exhaust temperature threshold, controller 114 may adjust variables (e.g., fan speed, power, etc.) of information handling system 102.

If a desired ΔT is set, controller 114 may determine a current ΔT and compare the current ΔT to the desired ΔT. To determine the current ΔT, controller 114 may receive via, for example, a power management bus (PMbus) the power consumption of information handling system 102. Controller 114 may also receive the operating fan speeds of cooling fan(s) 112 and correlate the received fan speed to a flow rate of cooling fan(s) 112. Using a heat transfer relationship, current ΔT may be calculated as follows:

$$\Delta T = \frac{Q}{mCp}, \qquad \text{Eq. 1}$$

where m is the flow rate of the airflow provided by cooling fan(s) 112, $C_p$ is the specific heat capacity for air, and Q is the received power consumption of system 102. If the current ΔT is greater than the desired ΔT, controller 114 may adjust the fan speed of cooling fans 112 to achieve the desired ΔT. In some embodiments, the flow rate, and hence the fan speed of cooling fans 112 may be increased above a cooling requirement of a component of racks 100.

If the desired threshold (e.g., desired exhaust temperature threshold and/or desired ΔT threshold) is exceeded, controller 114 may adjust the fan speed of cooling fans 112. In some embodiments, controller 114 may refer to one or more fan speed curves stored in a memory (e.g., memory 110) associated with controller 114, where each curve is a function of power and ΔT. In other embodiments, controller 114 may use a pre-populated lookup table that includes entries of one or more fan speeds, where each fan speed is a function of power and ΔT.

In some embodiments, controller 114 may incrementally adjust the fan speed and measure the exhaust temperature and/or ΔT until the current exhaust temperature and/or the current ΔT value is below the desired threshold. For example, controller 114 may overshoot and ramp up the fan speed (e.g., to a maximum fan speed) and incrementally adjust the fan speed until the desired threshold is achieved.

In some embodiments, if the desired threshold (e.g., desired exhaust temperature threshold and/or desired ΔT threshold) is exceeded, controller 114 may decrease the power supplied to information handling system 102. In some embodiments, controller 114 may incrementally adjust the power supply, measure the current exhaust temperature and/or current ΔT until the current exhaust temperature and/or current ΔT value is below the desired threshold. In other embodiments, controller 114 and/or processor 104 may calculate the target power, Q, to satisfy the desired ΔT threshold value using, for example, Eq. 1. Similarly, controller 114 and/or processor 104 may calculate the target power, Q, to satisfy the desired exhaust temperature threshold using, for example, Eq. 1, where ΔT is the difference between the desired exhaust temperature threshold and the temperature of the airflow $T_1$ from air handling unit 116.

FIG. 2 illustrates a flow chart of an example method for controlling the temperature change in a system, in accordance with certain embodiments of the present disclosure. At step 202, controller 114 may receive a desired threshold value set by a user or system 10. The threshold may be a ΔT threshold value and/or an exhaust temperature value.

In some embodiments, the desired ΔT threshold value and/or desired exhaust temperature value may be set to optimize certain operating conditions. For example, a user may select a desired ΔT threshold value and/or desired exhaust temperature value to reduce or minimize surface temperatures or exhaust of the components of racks 100 (e.g., for maintenance), reduce or minimize noise in a space housing system 10, or meet certain component implementations.

At step 204, controller 114 may determine a current real-time value of system 10, such as current exhaust temperature and/or current ΔT. In some embodiments, controller 114 may periodically (e.g., at a predetermined time interval) or continuously receive the power consumption of the components of racks 100 and the fan speeds of cooling fans 112. Based at least on the received data, controller 114 may correlate the data by, for example, correlating the power consumption to energy and correlating the fan speed to a flow rate. Based on the correlated date, controller may determine the current ΔT by, for example, calculating ΔT using Equation 1. Similarly, controller 114 may determine a current exhaust temperature by first determining a current ΔT value and then determining a difference between the temperature of the air provided by air handling unit 116 and a current ΔT.

At step 206, controller 114 may determine if the current real-time system value determined at step 204 exceeds the predetermined threshold received at step 202. If the current real-time value is less than the desired threshold value, method 200 may proceed to step 204, where controller 114 periodically or continuously determines the current real-time values. If the current real-time system value exceeds the desired ΔT value, method 200 may proceed to step 208 where controller 114 may determine if other system settings have been enabled.

At step 208, controller 114 may determine if a user has enabled system configuration allowing for different techniques to be used in order to reduce the current real-time system value. In some embodiments, the system configuration may be a power shedding mode, which allows controller 114 to adjust the power delivered to information handling system 102 in order to reduce the current real-time system value such as ΔT temperature and/or the current exhaust temperature. If system configuration is not enabled, method 200 may proceed to step 210. If the system configuration is enabled, method 200 may proceed to step 212.

At step 210, controller 114 may retrieve data from, for example, stored lookup table or fan speed curves in a memory device associated controller 114. In some embodiments, each fan curve or entry of the lookup table may be generated as a function of power used in rack(s) 100 and the desired ΔT threshold and/or desired exhaust temperature. For example, controller 114 may determine for the desired ΔT received at step 202 and for the current power consumption of components of racks 100, a certain fan speed (RPM) for cooling fan(s) 112 may yield a specific air flow (CFM). Thus, at step 210, if the current ΔT exceeds the desired ΔT, controller 114 may increase the flow rate (e.g., increase the fan speed of cooling fans 112) to reduce the current ΔT to below the desired ΔT.

At step 214, once the new cooling fan settings have been determined, controller 114 may dynamically adjust cooling fans. Method 200 may subsequently return to step 204 to determine if the threshold values are exceeded.

At step 212, after determining that system configuration has been enabled, controller 114 may incrementally adjust the system configuration of information handling system 102. For example, in one embodiment the system configuration may be a power shedding mode. If the power shedding mode is enabled, controller may adjust the power supplied to information handling system 102. Next, controller 114 may measure the current exhaust temperature and/or current ΔT (return to step 206) until the current exhaust temperature and/or current ΔT value is below the desired threshold. In other embodiments, controller 114 and/or processor 104 may calculate the target power, Q, to satisfy the ΔT value threshold using, for example, Eq. 1. Similarly, controller 114 and/or processor 104 may calculate the target power, Q, to satisfy the exhaust temperature threshold using, for example, Eq. 1, where ΔT is the difference between the exhaust temperature threshold and the temperature of the airflow $T_1$ from air handling unit 116.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. Additionally, one or more steps of method 200 may be combined. For example, in some embodiments, steps 210 and 214 may be combined. Controller 114 may determine a new cooling fan setting by incrementally adjusting the fan speed. Next, method 200 may return to step 204 to determine a new real time value and whether the new value is below the pre-determined threshold (step 206). If the threshold is still exceeded, controller may incrementally adjust the fan setting of cooling fans 112, and steps 204, 206, 210/214 may be repeated until the current system value is below the desired threshold.

Using the methods and systems disclosed herein, problems associated with conventional approaches to limiting the temperature changes in a space housing system 10 may be improved, reduced, or eliminated. For example, the methods and systems disclosed herein may be used to maintain a desired ΔT in order to provide for a more predictable handling of the components of system 10 as well as other components near or adjacent to system 10, such as other systems in a data center housing system 10. As another example, maintaining a desired ΔT allows for safer handling of the components housed within the rack, e.g., hot-swapping and/or direct maintenance of components.

Although the present disclosure has been described in detail, it should be understood that various changes, substitutions, and alterations can be made hereto without departing from the spirit and the scope of the disclosure as defined by the appended claims.

What is claimed is:

1. A method for controlling temperatures in an information handling system, the method comprising:
    receiving a desired threshold value;
    determining a current real-time system value, wherein determining the current real-time system value comprises:
        receiving a power consumption value for a component associated with the information handling system;
        receiving a fan speed of a cooling fan associated with the information handling system; and
        determining a current temperature differential value based at least on the power consumption value and the fan speed;
    determining if the current real time system value exceeds the desired threshold value;
    determining if a power shedding mode is enabled;
    if the power shedding mode is enabled, adjusting power supplied to the information handling system; and
    if the power shedding mode is not enabled, dynamically adjusting the fan speed of the cooling fan such that the current real time system value is reduced to a value at or below the desired threshold value.

2. The method according to claim 1, wherein determining the current real-time system value further comprises determining a current exhaust temperature based on the current temperature differential value.

3. The method according to claim 1, wherein dynamically adjusting the fan speed of the cooling fan comprises determining the fan speed as a function of a power consumption value and a desired temperature differential value.

4. A method, comprising:
    receiving a desired temperature differential value;
    receiving a power consumption value for a component associated with an information handling system;
    receiving a fan speed of a cooling fan associated with the information handling system;
    determining a current temperature differential value based at least on the power consumption value and the fan speed;
    determining if the current temperature differential value exceeds the desired temperature differential value;
    determining if a power shedding mode is enabled;
    if the power shedding mode is enabled, adjusting power supplied to the information handling system; and if the power shedding mode is not enabled, dynamically adjusting the fan speed of the cooling fan such that the current temperature differential value is reduced to a value at or below the desired temperature differential value.

5. The method according to claim 4, wherein dynamically adjusting the fan speed comprises determining the fan speed as a function of the power consumption value and the desired temperature differential value.

6. The method according to claim 4, wherein adjusting the fan speed comprises determining the fan speed from a fan speed curve, wherein the fan speed curve is a function of the power consumption value and the desired temperature differential value.

7. A system for controlling temperatures in an information handling system, the system comprising:
   a cooling fan configured to direct cool air to components of the information handling system; and
   a controller communicatively coupled to the cooling fan and configured to:
      receive a predetermined threshold value;
      determine a current real-time system value, wherein determining the current real-time system value comprises:
         receiving a power consumption value for the components of the information handling system;
         receiving a fan speed of the cooling fan; and
         determining a current temperature differential value based at least on the power consumption value and the fan speed;
      determine if the current real-time system value exceeds the predetermined threshold value;
      determine if a power shedding mode is enabled;
      if the power shedding mode is enabled, adjust power supplied to the information handling system; and
      if the power shedding mode is not enabled, dynamically adjust the fan speed of the cooling fan such that the current real-time system value is reduced to a value at or below the predetermined threshold value.

8. The system according to claim 7, wherein determining the current real-time system value further comprises determining a current exhaust temperature based on the current temperature differential value.

9. The system according to claim 7, wherein dynamically adjusting the fan speed of the cooling fans comprises determining the fan speed as a function of a power consumption value and a desired temperature differential value.

10. The system according to claim 7, wherein dynamically adjusting the fan speed of the cooling fan comprises determining the fan speed from a fan speed curve, wherein the fan speed curve is a function of a power consumption value and a desired temperature differential value.

11. The system according to claim 7, wherein the controller is further configured to receive a power consumption value of the components of the information handling system via a PMbus.

12. The system according to claim 7, wherein the controller is further configured to correlate the fan speed of the cooling fan to a flow rate value.

13. The system according to claim 7, wherein the controller is further configured to adjust the fan speed of the cooling fan above the fan speed required by the components.

14. The system according to claim 7, wherein the information handling system is housed in a rack.

* * * * *